United States Patent
Stockinger et al.

(10) Patent No.: US 10,604,026 B2
(45) Date of Patent: Mar. 31, 2020

(54) VEHICLE CONNECTION DEVICE AND VEHICLE CONNECTION SYSTEM

(71) Applicant: easE-Link GmbH, Graz (AT)

(72) Inventors: Hermann Stockinger, Graz (AT); Manuel Leibetseder, Graz (AT)

(73) Assignee: easE-Link GmbH (AT)

(*) Notice: Subject to any disclaimer, the term of this patent is extended or adjusted under 35 U.S.C. 154(b) by 0 days.

(21) Appl. No.: 16/348,214

(22) PCT Filed: Oct. 25, 2017

(86) PCT No.: PCT/EP2017/077256
§ 371 (c)(1),
(2) Date: May 8, 2019

(87) PCT Pub. No.: WO2018/086883
PCT Pub. Date: May 17, 2018

(65) Prior Publication Data
US 2019/0263278 A1    Aug. 29, 2019

(30) Foreign Application Priority Data

Nov. 8, 2016    (DE) .......................... 10 2016 121 355

(51) Int. Cl.
*H02J 7/00* (2006.01)
*B60L 53/16* (2019.01)
(Continued)

(52) U.S. Cl.
CPC ............... *B60L 53/16* (2019.02); *B60L 53/14* (2019.02); *H01R 13/5219* (2013.01);
(Continued)

(58) Field of Classification Search
CPC ........... H02J 5/005; H02J 7/0042; H02J 7/355
(Continued)

(56) References Cited

U.S. PATENT DOCUMENTS 8,307,967 B2    11/2012    Patwardhan
9,566,872 B2 *    2/2017    Eger ..................... B60L 11/182
(Continued)

FOREIGN PATENT DOCUMENTS

DE    2330255 A1    1/1975
DE    102010029833 A1    1/2011
(Continued)

OTHER PUBLICATIONS

International Search Report issued in PCT Application No. PCT/EP2017/077256 dated Feb. 6, 2018.

*Primary Examiner* — Phuong Chi Thi Nguyen
(74) *Attorney, Agent, or Firm* — Dilworth IP, LLC (57) ABSTRACT

A vehicle connection device for electrically connecting a vehicle contact unit to a ground contact unit of an electric charging infrastructure has the vehicle contact unit, a pneumatically operated contacting actuator adapted to move the vehicle contact unit, and at least one air outlet for blowing the ground contact unit free, the vehicle contact unit including a base having a contacting area facing the ground contact unit and having at least two electrodes, and the at least one air outlet for blowing the ground contact unit free being directed to a region in front of the contacting area, the compressed air for operating the contacting actuator being guided to the air outlet in order to blow the ground contact unit free. Further, a vehicle connection device having a guide device and a vehicle connection system are shown.

23 Claims, 8 Drawing Sheets (51) Int. Cl.
  *H01R 13/52*    (2006.01)
  *H01R 13/62*    (2006.01)
  *H01R 13/629*   (2006.01)
  *B60L 53/14*    (2019.01)

(52) U.S. Cl.
  CPC ....... *H01R 13/6205* (2013.01); *H01R 13/629* (2013.01); *H01R 2201/26* (2013.01); *Y02T 10/7005* (2013.01); *Y02T 10/7072* (2013.01); *Y02T 90/14* (2013.01)

(58) Field of Classification Search
  USPC .................. 320/107, 108, 109, 114, 115
  See application file for complete search history.

(56) References Cited

U.S. PATENT DOCUMENTS

| | | | |
|---|---|---|---|
| 9,682,632 B2* | 6/2017 | Brill | B60L 53/12 |
| 2014/0292266 A1* | 10/2014 | Eger | B60L 11/182 |
| | | | 320/108 |
| 2015/0224882 A1* | 8/2015 | Brill | H01F 38/14 |
| | | | 320/108 |

FOREIGN PATENT DOCUMENTS

| | | |
|---|---|---|
| DE | 102013103157 A1 | 10/2014 |
| DE | 102015202295 A1 | 8/2016 |
| EP | 2039557 A1 | 3/2009 |
| JP | 2014150642 A | 8/2014 |
| WO | 03075416 A1 | 9/2003 |
| WO | 2010098412 A1 | 9/2010 |
| WO | 2011065816 A2 | 6/2011 |
| WO | 2014029439 A1 | 2/2014 |

* cited by examiner

VEHICLE CONNECTION DEVICE AND VEHICLE CONNECTION SYSTEM

FIELD OF THE DISCLOSURE

The disclosure relates to a vehicle connection device for electrically connecting a vehicle contact unit to a ground contact unit of an electric charging infrastructure, and a vehicle connection system for an electric charging infrastructure.

BACKGROUND

In electrically powered vehicles, such as plug-in hybrid vehicles and pure electric vehicles, the batteries of the vehicles have to be charged regularly, preferably after each trip. For this purpose, the vehicle is connected to the charging infrastructure by means of a vehicle connection system.

For example, vehicle connection systems with a contact unit of the charging infrastructure that is provided on the ground are known. This ground contact unit, arranged on the ground, is physically contacted by means of a displaceable vehicle contact unit, which can move downwards from the underbody of the vehicle. This allows the vehicle to be electrically connected to the charging infrastructure.

These vehicle connection systems require a physical contact between the electrodes of the vehicle contact unit and the contact surfaces of the ground contact unit. With these systems, problems occur due to the contact surfaces of the ground contact unit and the electrodes of the vehicle contact unit becoming soiled or the vehicle contact unit not resting on the ground contact unit properly. Also, over time, an oxide layer will form on the electrodes or the contact surfaces, which increases the electrical resistance of the connection between the electrodes and the contact surfaces.

The soiling or the oxide layer on the contact surfaces or on the electrodes reduces the contact area and increases the resistance of the electrical connection, so that large power losses may occur during charging.

Also, liquids on the ground contact unit may cause leakage currents to occur between the electrode surfaces, resulting in power losses.

In addition, it is necessary that the vehicle contact unit is lowered evenly and parallel to the ground contact unit in order to allow optimum contacting. Otherwise, the electrical connection between the electrodes and the contact surfaces is impaired, and power losses are to be expected.

SUMMARY

Thus, there is a need to provide a vehicle connection device and a vehicle connection system which are adapted to provide an electrical connection of the vehicle-mounted contact unit to a contact unit, arranged on the ground, of the charging infrastructure with high quality and low losses.

The object is achieved by a vehicle connection device for electrically connecting a vehicle contact unit to a ground contact unit of an electric charging infrastructure, comprising the vehicle contact unit, a pneumatically operated contacting actuator which is adapted to be fastened to the vehicle to which the vehicle contact unit is fastened and which is adapted to move the vehicle contact unit towards and away from the ground contact unit, and at least one air outlet for blowing the ground contact unit free. The vehicle contact unit includes a base having a contacting area facing the ground contact unit and having at least two electrodes, the at least one air outlet for blowing the ground contact unit free being directed to a region in front of the contacting area, the compressed air for operating the contacting actuator being guided to the air outlet in order to blow the ground contact unit free. The region in front of the contacting area here is, for example, the space between the base and the ground contact unit. The air outlet is an air nozzle, for example. Furthermore, the base may be circular and/or a plate. The electrodes may be arranged on rings.

With the aid of the air outlet, an air stream can be generated in the region in front of the contacting area, impinging on the ground contact unit. The air stream thus blows impurities such as dirt, liquid or leaves away from the ground contact unit, in particular from the contact surfaces of the ground contact unit. The fact that the air outlet is provided in the vehicle contact unit allows the vehicle contact unit first to be approached to the ground contact unit by the contacting actuator, which is at least partially operated by means of the compressed air, until only a gap is left between the ground contact unit and the base. The air outlet can introduce the air flow into this gap so that the ground contact unit can be blown free at a particularly high pressure.

The compressed air thus both at least partially drives the contacting actuator and then flows to the air outlet. By using the compressed air twice, synergy effects can be utilized and the complexity of the vehicle connection device can be kept low. The compressed air for the contacting actuator and for the blowing-free process may be provided by the same compressed air source.

Preferably, the at least one air outlet is provided in the base of the vehicle contact unit, more particularly the air outlet opens in the contacting area, so that the air stream is generated where it is needed, namely in the area of the electrodes.

For example, the at least one air outlet is provided between two electrodes, in particular in the region of the middle of the contacting area, so that the air stream flows outwards and past the electrodes, as a result of which the impurities are also carried outwards.

In one configuration of the disclosure, a plurality of air outlets are provided, at least one of the electrodes being arranged between the air outlets, so that a sufficient quality of the blowing free is achieved even if the air stream is blocked at a certain location by a larger amount of impurities, for example by leaves that are caught on an electrode.

For example, the contacting area and/or the base is/are circular, the at least one air outlet being arranged centrally, in particular in the center of the contacting area and/or of the base. The central arrangement of the air outlet allows the ground contact unit to be effectively blown free with only one air outlet.

Preferably, the base includes a sealing lip which preferably completely encircles the contacting area. For one thing, the sealing lip prevents dirt or liquids from finding their way back into the area between the base and the ground contact unit after having been blown out. For another, an air cushion is produced between the base and the ground contact unit, on which the base floats. This allows the base to be aligned with the ground contact unit more easily. The sealing lip may, for example, be provided at the circumference of the base.

In one configuration of the disclosure, the at least one air outlet is provided next to the vehicle contact unit, so that the ground contact unit can be produced independently of the air outlet, thereby reducing the complexity.

Alternatively or additionally, the at least one, or one, air outlet is formed at a compressed air line extending laterally of the contacting actuator, whereby an air outlet can be realized in a simple manner.

In one configuration of the disclosure, the at least two electrodes are in the form of pins or tracks which project with respect to the front of the base and are fastened to the base, in particular resiliently mounted. The mounting is effected, for example, by means of leaf springs or spiral springs. This allows a particularly reliable contact between the contact surfaces of the ground contact unit and the electrodes in the base.

In one variant embodiment, the base has a vent opening provided therein, at least one of the electrodes being arranged between the vent opening and the at least one air outlet, which allows air to flow around the contacts even when the sealing lip rests on the ground contact unit.

In one configuration of the disclosure, at least one magnet is provided at the base on the side of the contacting area, in particular in the contacting area. The magnet may be a permanent magnet, a switchable magnet such as an electromagnet, or a combination thereof. With the aid of the magnet, the vehicle contact unit can be aligned above and in relation to the ground contact unit and held in place at the ground contact unit.

The contacting actuator may comprise a piston/cylinder unit or a bellows which include an interior space, a basic section and a compressed air source that is adapted to be brought in fluid communication with the interior space, a first end of the piston/cylinder unit or of the bellows being adapted to be connected to the vehicle by means of the basic section, and the base being fastened to a second end of the piston/cylinder unit or of the bellows. The interior space is sealed so as to be airtight, and the basic section may be part of the vehicle. For example, the compressed air source is a compressor or a compressed air accumulator. A contacting actuator is implemented in a simple manner by the piston/cylinder unit or the bellows.

In case a bellows is used, the bellows need not be actuated completely by the compressed air. It is also conceivable that the bellows is also stretched by its own weight and/or the weight of the vehicle contact unit, e.g. when the vehicle contact unit is lowered. The compressed air then assists the lowering process and contributes to stabilization. The vertical position of the base can then be precisely adjusted by appropriate tension elements, in particular in the interior space of the bellows.

Preferably, the at least one air outlet is in fluid communication with the interior space, in particular via a valve or a throttle, so that the compressed air inside the interior space serves to actuate the contacting actuator and to blow the ground contact unit free, or the air outlet is formed at a compressed air line extending within the interior space. The compressed air line may be designed to be flexible here in order not to be damaged during movement of the actuator. The compressed air line may also be in fluid communication with a second compressed air source, allowing the air outlet to be actuated independently of the contacting actuator. Also, an air line may have a plurality of air outlets formed thereon. For example, the second compressed air source is a compressor or a compressed air accumulator.

In one configuration of the disclosure, the vehicle connection device includes a heating element that is in fluid communication with the at least one air outlet for heating the air exiting the air outlet. For example, the heating element heats the air in the interior space. Heated air allows snow or ice to be efficiently removed from the ground contact unit.

The object is further achieved by a vehicle connection device for connecting a vehicle contact unit to a ground contact unit of a charging infrastructure, in particular as described above, including the vehicle contact unit which includes a base, and a contacting actuator which includes a bellows having an interior space, a base, a guide device and a compressed air source, a basic section of the bellows being adapted to be connected to the vehicle, and a first end of the bellows being fastened to the basic section, and the base being fastened to a second end of the bellows. The guide device comprises a restoring drive, in particular a spindle mounted for rotation, and at least one tension element which extends at least partly within the interior space and has one end fastened to the base and another end fastened to the restoring drive. The tension element may be a band, a cord and/or a rope here. The basic section may again be part of the bellows. The guide system makes it possible to control the movement of the base such that the base is in a horizontal position at all times. This prevents the base from tilting and resting on the ground contact unit at an angle or only partly. In addition, the position of the base, which is always horizontal, ensures that the air stream from the air outlet actually impinges on the ground contact unit. The guide unit thus results in an improved quality of the contact. For example, the compressed air source is a compressor or a compressed air accumulator.

Preferably, three tension elements are provided, whereby a particularly cost-effective, but reliable structure is realized.

For example, the guide device includes a spiral spring and/or an electric motor drive fastened to the spindle in such a way that it applies a torque to the spindle so that a tensile force acts on the tension elements. In the process, the tensile force pulls the tension elements towards the spindle. In this way, a reliable restoring drive for the contacting actuator is realized.

In one variant embodiment, a first locking element is provided on the base and a second locking element is provided on the basic section, wherein, when the bellows is in a collapsed position, the first locking element and the second locking element cooperate with each other such that they can hold the bellows in this position. This ensures that the base is securely fastened to the vehicle while the vehicle is in motion and cannot disengage.

For example, the locking mechanism can be released again particularly simply if the first locking element and the second locking element include magnets, one of which comprises a switchable electromagnet.

In one variant embodiment, the first locking element and the second locking element include latching hooks which engage with each other when the bellows is in its collapsed position, one of the latching hooks being swivel-mounted. In this way, a mechanical locking mechanism that is thus hardly error-prone is realized.

In a further configuration of the disclosure, the contacting actuator can move the vehicle contact unit in a contacting direction, and the vehicle connection device includes a sliding actuator which is connected to at least one of the electrodes such that it can move the at least one of the electrodes of the vehicle contact unit in a sliding direction transverse to the contacting direction.

The contacting direction may be perpendicular to the contacting area and/or to the ground contact unit here, in particular it is perpendicular to the electrical contact surfaces of the ground contact unit.

The movement in the sliding direction, i.e. the sliding movement, is independent of the movement for producing the contact. However, the connection between the sliding actuator and the electrodes may be effected via the base and, if required, via the contacting actuator, if the sliding actuator is not directly fastened to the electrode.

The sliding actuator allows the electrodes to be moved along the ground contact unit. In doing so, the oxide layers that have formed on the electrode or on the ground contact unit are safely removed. The electrode is therefore in direct connection with the ground contact unit, whereby the quality of the electrical connection between the electrode and the ground contact unit is considerably improved.

Preferably, the sliding actuator is configured such that when the at least two electrodes touch the ground contact unit, it can move the at least one electrode along parts of the ground contact unit. In particular, the sliding actuator moves the electrodes along the contact surface. This causes the electrode to slide on the contact surface, ensuring that there is no longer an oxide layer between the electrode and the contact surface.

For example, the sliding actuator comprises a vibration motor, at least one magnet, at least one piezo actuator and/or at least one electric motor, whereby effective sliding actuators can be realized in a simple way.

Preferably, the movement of the at least one electrode as generated by the sliding actuator is linear, along a polygon or along a curve. Here, the movement may be oscillating. Triangles or quadrangles are suitable as polygons, and circles, ellipses or segments thereof may be made use of as curves.

In one configuration of the disclosure, the sliding actuator includes a vibration motor which has an axis of rotation and a mass and is provided as part of the vehicle contact unit, in particular in or at the base. The mass rotates about the axis of rotation and generates a force perpendicular to the axis of rotation. By using a vibration motor, a movement of the base in the sliding direction may be made possible in a cost-effective way.

For example, the axis of rotation of the vibration motor is oriented in the contacting direction or perpendicular to the contacting direction, so that either an oscillating linear movement or a movement similar to a circle is generated as a sliding movement.

In one configuration of the disclosure, the sliding actuator includes at least two switchable magnets which are associated with at least one magnetic counterpart in the ground contact unit. The switchable magnets may be electromagnets here. Within the scope of the disclosure, switchable magnets are to be understood to also include magnets that can be detached from their associated magnetic counterparts by a movement. With the aid of the magnets, the base and thus the electrodes in the base can be oriented in a specific position in relation to the ground contact unit. The magnetic counterparts may themselves be permanent magnets or switchable magnets, but also components made of a ferromagnetic material such as iron or steel.

Preferably, the at least two magnets may be switched separately from each other, so that a movement in two steps is possible.

For example, each of the at least two magnets has a respective magnetic counterpart associated therewith, the two magnets being arranged at a distance from each other that is different from a corresponding distance at which the magnetic counterparts are arranged. When the magnets are switched on alternately, a movement of the base parallel to the connecting line between the two magnetic counterparts can be generated due to the distance between the magnets differing from the corresponding distance between the magnetic counterparts.

When there are three or more magnets, each distance between the magnets is different from the corresponding distance of the magnetic counterparts. This allows more complex sliding movements, such as movements in a triangle, to be realized.

Of course, it is also possible to have a plurality of sliding actuators having at least two magnets, as a result of which the force in the sliding direction can be increased.

In a further configuration of the disclosure, the sliding actuator includes at least two magnets, one of the magnets being arranged in the base and another of the magnets being arranged in one of the electrodes. At least one of the magnets is a switchable magnet such as an electromagnet. The other magnet may be a permanent magnet or else a switchable magnet as well. The two magnets are aligned in relation to each other so that when one of the magnets is activated, the other magnet is attracted or repelled, whereby a force is exerted on the electrode, causing it to move transversely to its longitudinal extent.

For example, the sliding actuator includes three magnets, with two of the magnets being provided in the base and one of the magnets being provided in one of the electrodes. This one of the electrodes is arranged between the two magnets of the base. The two magnets in the base may be switchable and a permanent magnet may be installed in the electrode. This allows the force of the sliding actuator to be increased.

In a further configuration of the disclosure, the sliding actuator includes a piezo actuator, which allows a high-frequency movement in the sliding direction in a simple manner.

For example, the piezo actuator is provided in the base and is fastened, on the one hand, to the base and, on the other hand, to one of the at least two electrodes, as a result of which the piezo actuator can move the electrode directly.

In one variant embodiment, a plurality of sliding actuators are provided, each of the sliding actuators being assigned to one of the at least two electrodes. In this way, the sliding movement of the electrodes can be controlled individually so that for electrodes where a high resistance is detected, a movement in the sliding direction can be carried out for a longer time.

For example, the sliding actuator is provided as part of the vehicle contact unit, in particular at the base. In this way, assembly may be simplified since the sliding actuator does not have to be mounted to the vehicle in addition to the vehicle contact unit.

In a further configuration of the disclosure, the sliding actuator includes at least one magnet that is arranged at the base, and an actuator, the actuator being adapted to move the magnet or at least one of the electrodes relative to the base, in particular in the sliding direction. Here, the magnet can cooperate with a magnetic counterpart of the ground contact unit such that the actuator moves the base in the sliding direction. As an alternative, the actuator can move the at least one electrode relative to the base. In this way, the magnet may both be used as a part of the sliding actuator and serve for fixing the vehicle contact unit in place on the ground contact unit and/or for aligning it therewith. For example, the magnet or the at least one electrode is guided on the base linearly or on a circular path.

In a further embodiment of the disclosure, the sliding actuator is configured separately from the vehicle contact unit, with the sliding actuator being adapted to move, in particular rotate, the entire vehicle contact unit. In this case, the vehicle contact unit is mounted for rotation in relation to the vehicle. In this way, the complexity of the vehicle contact unit may be reduced and the sliding actuator may be securely fastened to the vehicle.

For example, the sliding actuator includes an electric motor, which allows a simple and cost-effective movement of the vehicle contact unit.

The object is further achieved by a vehicle connection system including a vehicle contact unit according to the disclosure and a ground contact unit, the ground contact unit including at least two electrical contact surfaces for contact with the at least two electrodes of the vehicle contact unit. Contact surfaces are advantageous in that a less precise positioning of the electrodes for electrical contacting may thus be necessary.

Preferably, the ground contact unit includes at least one magnetic counterpart, allowing the vehicle contact unit and thus also the electrodes to be precisely and accurately aligned with respect to the ground contact unit and the contact surfaces. The magnetic counterparts may themselves be permanent magnets or switchable magnets, but also components made of a ferromagnetic material such as iron or steel.

For example, the ground contact unit has at least two magnetic counterparts that are arranged at a distance from one another, so that the sliding actuator can move the base in the sliding direction by means of the magnetic counterparts.

DESCRIPTION OF THE DRAWINGS

Further features and advantages of the disclosure will be apparent from the description below and from the accompanying drawings, to which reference is made and in which:

FIG. 14a schematically shows a further embodiment of the vehicle connection device according to the disclosure, with a sliding actuator;

FIG. 14b shows a section taken along the axis XIV-XIV of FIG. 14a;

FIG. 15a schematically shows a further embodiment of the vehicle connection device according to the disclosure, with a sliding actuator; and FIG. 15b shows a section taken along the axis XV-XV of FIG. 15a.

DETAILED DESCRIPTION

Figure 1:
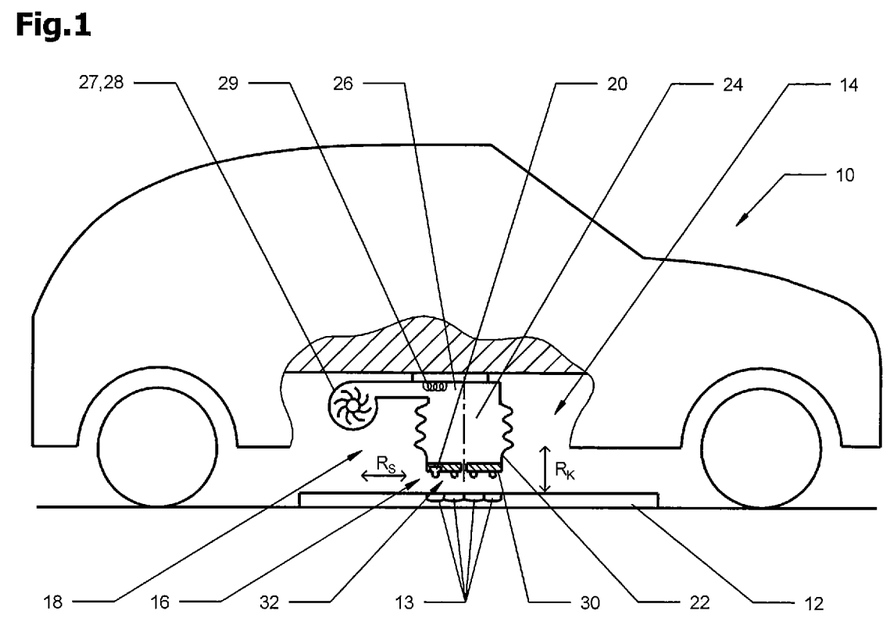
FIG. 1 schematically shows a vehicle with a vehicle connection device according to the disclosure.

FIG. 1 illustrates a vehicle 10, for example a battery-powered vehicle or a plug-in hybrid vehicle, parked on or above a ground contact unit 12 having contact surfaces 13 of an electric charging infrastructure (not shown).

The electric charging infrastructure serves to recharge the batteries of the vehicle 10 after a trip.

The underbody of the vehicle 10 has a vehicle connection device 14 fastened to it, which can electrically connect the vehicle 10 to the charging infrastructure, more precisely, which can electrically connect a vehicle contact unit 16 to the ground contact unit 12.

Figure 3:
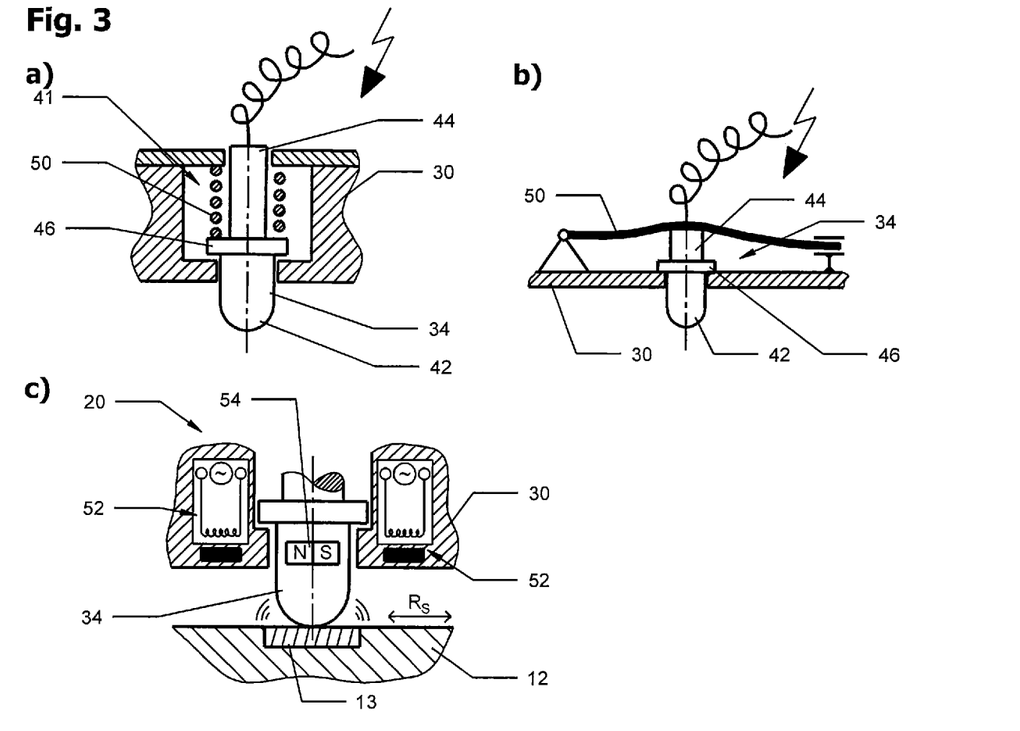
FIGS. 3a and 3b show sectional views of the vehicle contact unit in the region of an electrode in various embodiments for resiliently mounting the electrode.
FIG. 3c shows an enlarged view of a single electrode with a sliding actuator according to the disclosure.

Besides the vehicle contact unit 16, the vehicle connection device 14 includes a contacting actuator 18 and a sliding actuator 20 (FIG. 3c).

The contacting actuator 18 may comprise a bellows 22 having an interior space 24 and a basic section 26, and a compressed air source 27, such as a compressor 28. A heating coil 29 that heats the air in the interior space 24 of the bellows 22 may further be provided in the interior space 24 of the bellows 22 or in an air supply duct to the bellows 22.

The compressed air source 27 is in fluid communication with the interior space 24, so that the compressed air source 27 can inflate the bellows 22.

A vehicle-side first end of bellows 22 is fastened to vehicle 10, in particular to the underbody of the vehicle, by means of the basic section 26. The vehicle contact unit 16 is fastened to the second end of the bellows 22 facing away from the vehicle 10.

Figure 2:
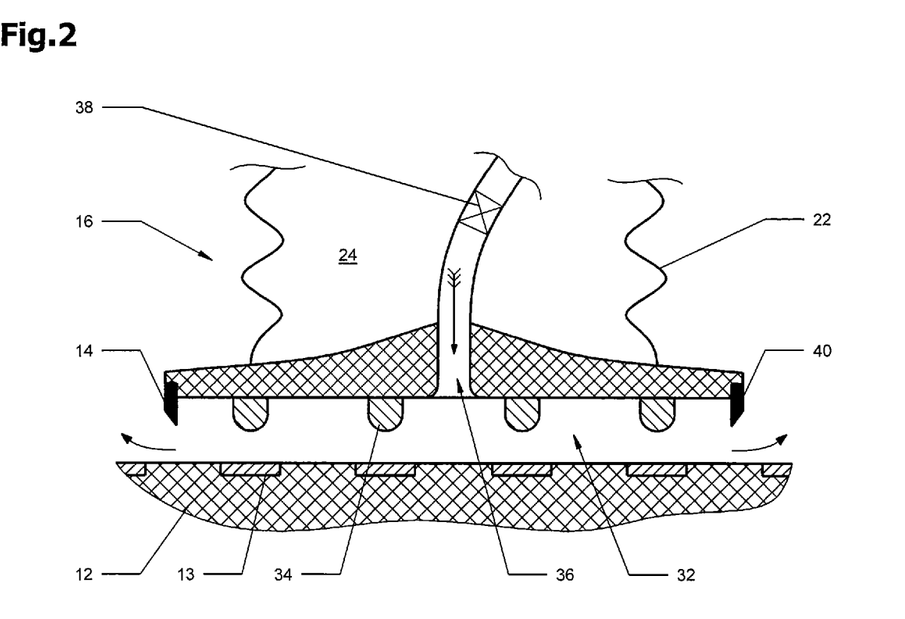
FIG. 2 shows a greatly simplified and schematic sectional view of the vehicle contact unit of the vehicle connection device according to FIG. 1.

The vehicle contact unit 16 is illustrated in FIG. 2 and includes a base 30, for example in the form of a plate, in particular a circular plate, which closes the second end of the bellows 22. The plate is more particularly made from a plastic material.

On the front side of the base 30 facing away from the vehicle 10, that is, the side of the base 30 facing the ground contact unit 12, the base 30 has a contacting area 32 in which at least two electrodes 34 are arranged.

Further provided in the base 30 is an air outlet 36 which, on the one hand, is supplied from the interior space 24 and, on the other hand, opens into the contacting area 32. The air outlet 36 may also be configured as an air nozzle.

For example, the air outlet 36 opens out between two electrodes 34 and in the center of the base 30, i.e. centrally and in the region of the center of the contacting area 32. As a result, the air outlet 36 is directed into a region in front of the contacting area 32, that is, into a region between the base 30 and the ground contact unit 12.

The air outlet 36 is connected to the interior space 24 by means of a controllable valve 38, which may be in the form of a throttle, so that air from the interior space 24 can be blown out of the air outlet 36 if required.

In addition, the base 30 includes a sealing lip 40, which is provided on the outer circumference of the base 30 and completely encircles the base 30 and the contacting area 32.

As can be seen in FIG. 3a, the electrodes 34 in the base 30 are each spring-mounted in a respective cavity 41 of the base 30.

The electrodes 34 are configured as pins and each include a contact tip 42, a base body 44 and a shoulder 46, which is arranged between the base body 44 and the contact tip 42.

The shoulder 46 and portions of the base body 44 are arranged within the cavity 41, whereas the contact tip 42 extends from the cavity 41 in the contacting area 32 and projects in relation to the front side of the base 30.

Also provided in the cavity 41 is a spring 50, which rests, on the one hand, against the wall of the cavity 41 facing away from the contacting area 32 and, on the other hand, against the shoulder 46.

The spring 50 is a compression spring so that it exerts a force on the shoulder 46 and thus on the entire electrode 34 towards the contacting area 32.

It is also conceivable, as illustrated in FIG. 3b, that the spring 50 is a leaf spring which acts on the end of the base body 44 facing away from the contact tip 42.

FIG. 3c shows the sliding actuator 20 of the first embodiment, which is provided on each of the electrodes 34. The sliding actuator 20 includes three magnets. Two of the three magnets are electromagnets 52, i.e. switchable, and are arranged in the base 30 at the respective electrode 34 on opposite sides of the electrode 34.

The third magnet is a permanent magnet 54, which is provided in the electrode 34 such that it is positioned between the two electromagnets 52.

Now if the two electromagnets 52 are operated such that they have opposite polarities, the permanent magnet 54 inside the electrode 34 is attracted by one of the electromagnets 52 and repelled by the other. This causes the electrode 34 to move laterally, i.e. transversely to its longitudinal extent, in a sliding direction $R_S$.

Then when the polarities of the electromagnets 52 are reversed, the electrode 34 is moved in the opposite direction. This allows the electrode 34 to be reciprocated laterally by a quick changeover of the electromagnets 52.

Figure 4:
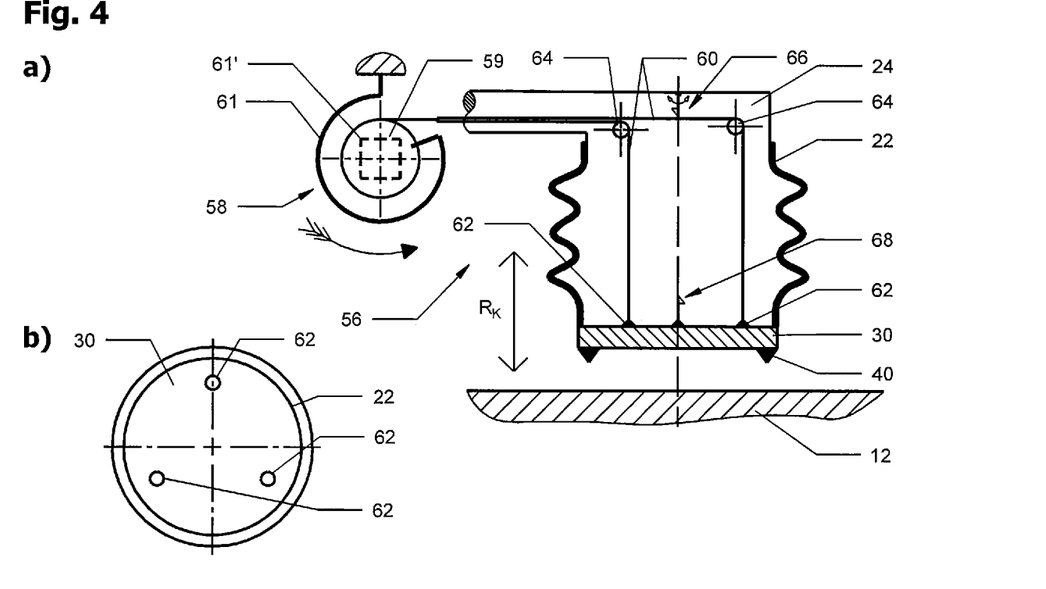
FIGS. 4a and 4b show greatly simplified schematic sectional views of the vehicle connection device according to FIG. 1 in a longitudinal and a cross section, respectively.

FIG. 4 illustrates a guide device 56 of the contacting actuator 18, which is not shown in FIG. 1 for reasons of clarity. On the other hand, FIG. 4 does not illustrate the air outlet 36 and the compressor 28. The guide device 56 includes a restoring drive 58 and tension elements 60.

The restoring drive 58 has a spindle 59 which is mounted for rotation in relation to the vehicle 10, tension elements 60 and a spiral spring 61.

One end of the spiral spring 61 is fastened to the spindle 59 and its other end is fixed to the vehicle 10 so that the spiral spring 61 can apply a torque to the spindle 59.

It is also conceivable that instead of or in addition to the spiral spring 61, an electric motor drive 61', such as an electric motor, is provided for rotating the spindle 59. FIG. 4a illustrates, in dashed lines, such an electric motor drive 61' in the form of an electric motor.

The tension elements 60 may be bands, cords or ropes, and are also attached by one end to the spindle 59, so that the tension elements 60 are rolled up on the spindle 59 when the spindle 59 is rotated.

The other end of each of the tension elements 60 is connected to the base 30 at a connection point 62.

As can be seen in FIG. 4b, in the embodiment shown, three tension elements 60 are provided, which are each connected to the base 30 at a respective connection point 62.

The connection points 62 are arranged in an equilateral triangle, the center of which is at the same time the center of the base 30.

The tension elements 60 run from the connection points 62 in the interior space 24 of the bellows 22 vertically from the base 30 towards the basic section 26. The tension elements 60 are deflected by means of deflection pulleys 64, which may be provided in the interior space 24, and are then guided towards the spindle 59.

Here, the length of the tension elements 60 is selected such that the three connection points 62 and thus the base 30 are always oriented horizontally. In this way, the base 30 is always parallel to the ground contact unit 12.

For locking the vehicle contact unit 16 in its retracted position, a first locking element 66 and a second locking element 68 are further provided in the middle of the base 30 in the interior space 24 and on the opposite side at the basic section 26, respectively, the locking elements being configured as latching hooks in the first embodiment shown.

The second locking element 68, i.e. the latching hook at the basic section 26, is swivel-mounted here and can be swiveled from its vertical position.

Figure 5:
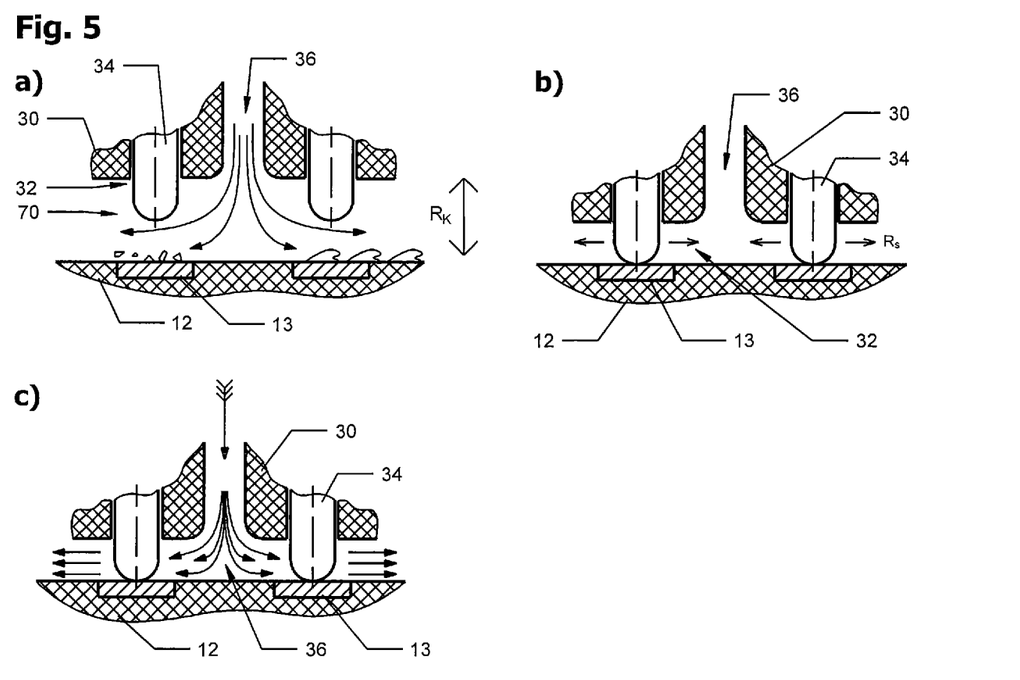
FIGS. 5a to 5c show various steps during establishing the electrical connection between the vehicle contact unit and a ground contact unit.
Figure 6:
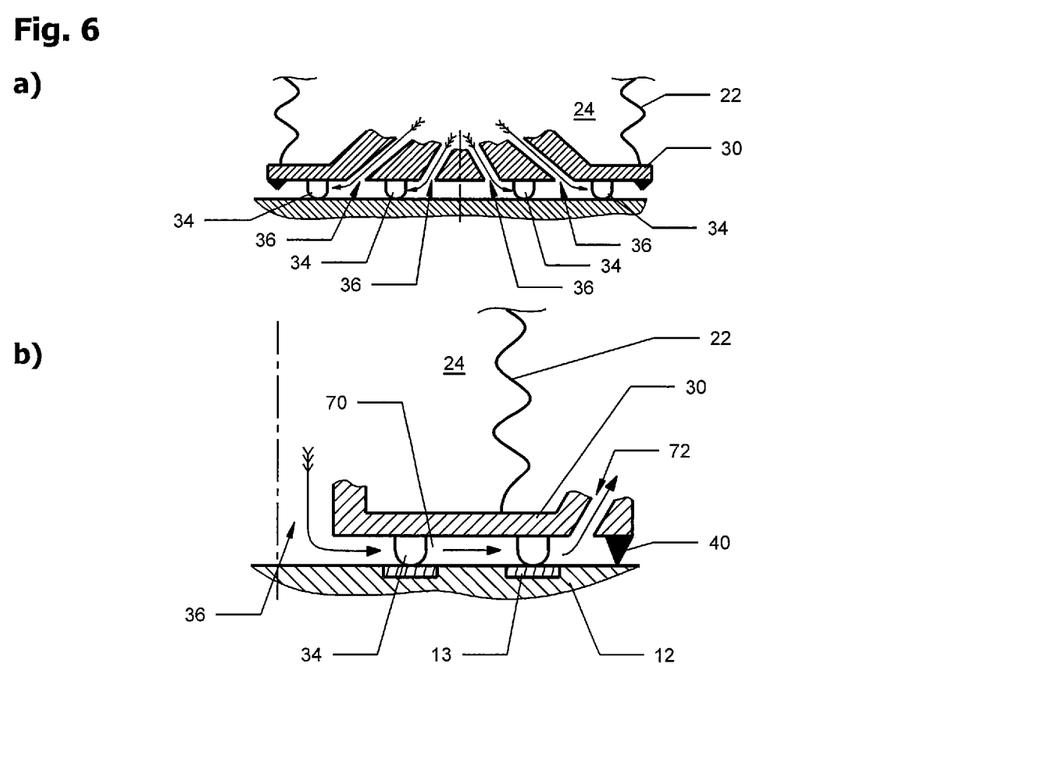
FIGS. 6a and 6b show, in a greatly simplified manner, further embodiments of the vehicle contact unit according to the disclosure.

FIGS. 5a to c illustrate various steps during the contacting of the vehicle contact unit 16 with the ground contact unit 12.

The vehicle contact unit 16 can be moved towards and away from the ground contact unit 12 with the aid of the contacting actuator 18. Here, the direction of movement is perpendicular to the ground contact unit 12 and perpendicular to the contacting area 32 and will be referred to as the contacting direction $R_K$ below.

It is, of course, also conceivable that the vehicle contact unit 16 is not only moved in the contacting direction $R_K$ by the contacting actuator 18, but that when the vehicle contact unit 16 is lowered, a movement component in some other direction can be added at the same time. This is the case, for example, if the contacting actuator 18 is a swivel arm.

When the vehicle connection device 14 is in its retracted position, i.e. the vehicle contact unit 16 is pulled close to the basic section 26, the bellows 22 is pushed together and the locking hooks, i.e. the first locking element 66 and the second locking element 68, are in engagement with each other.

The locking elements 66, 68 thus hold the bellows 22 in its collapsed position.

Now when the vehicle 10 is parked above a ground contact unit 12, it is intended to charge the vehicle. For this purpose, the vehicle contact unit 16 is lowered, that is, moved towards the ground contact unit 12.

First, the second locking element 68 is swiveled so that the bellows 22 is released and can be inflated.

Then the compressed air source 27, i.e. here the compressor 28, is activated and supplies compressed air to the interior space 24 of the bellows 22. The bellows 22 is inflated and stretched by the compressed air, as a result of which the vehicle contact unit 16 is moved towards the ground contact unit 12 in the contacting direction $R_K$.

At the same time the vehicle contact unit 16 moves towards the ground contact unit 12 due to its own weight and straightens or stretches the bellows 22 in the process. The compressed air and gravity thus both contribute to the movement of the vehicle contact unit 16. It can therefore be said that the compressed air partially actuates the bellows 22, so that the contacting actuator 18 is thus also operated pneumatically.

In particular, the compressed air stabilizes the movement of the bellows 22, so that the vehicle contact unit 16 is lowered essentially in a straight line. This reliably prevents any deflections of the bellows 22 or of the vehicle contact unit 16.

In the process, the tension elements 60 are evenly unwound from the spindle 59 so that the horizontal orientation of the base 30 of the vehicle contact unit 16 is maintained during movement as well. At the same time, the spiral spring 61 is tensioned by the rotation of the spindle 59, so that the spiral spring 61 applies a torque to the spindle 59 contrary to the unwinding direction of the tension elements 60.

The vehicle contact unit 16 is first lowered until a gap 70 has formed between the base 30 and the ground contact unit 12. At this point in time, the electrodes 34 do not yet touch the contact surfaces 13 of the ground contact unit 12. In this position, the ground contact unit 12 is blown free.

The blowing-free process is illustrated in FIG. 5*a*. For blowing free, the valve 38 of the air outlet 36 is opened so that the compressed air can escape from the interior space 24 of the bellows 22. Since the air outlet 36 is directed into the area in front of the contacting area 32, in which the ground contact unit 12 is now located, the air stream from the air outlet 36 impinges on the ground contact unit 12.

The air impinging on the ground contact unit 12 then flows radially outwards through the gap 70 at high speed. The strong air stream also causes dirt, leaves or liquid, which were located on the ground contact unit 12, to be transported outwards. In case of temperatures below freezing or if there is already a layer of snow or ice, the heating 29 is activated so that the layer of snow or ice is removed and the contacts are dried.

The steady air flow allows the ground contact unit 12 to be blown free in that area which is now opposite the contacting area 32 of the vehicle connection device 14, so that the contact surfaces 13 in this area are free of dirt, leaves or liquid.

At the same time, the compressed air causes an air cushion to be formed in the gap 70, making it easier to shift the vehicle contact unit 16 in relation to the ground contact unit 12, which facilitates a lateral alignment of the vehicle contact unit 16 relative to the ground contact unit 12.

After the ground contact unit 12 has been blown free, the vehicle contact unit 16 is lowered further, i.e. moved towards the ground contact unit 12. In the process, air may continue to flow out of the air outlet 36.

During the lowering process, the gap 70 decreases and the sealing lip 40 and the electrodes 34 eventually come into contact with the ground contact unit 12. The guide device 56 ensures that the vehicle contact unit 16 is parallel to the ground contact unit 12, so that it is made sure at all times that all of the electrodes 34 rest on the ground contact unit 12.

The extended charging position of the vehicle contact unit 16 is reached.

In this position the sealing lip 40 closes the gap 70 in the radial direction so that no dirt, leaves or liquid can enter the gap 70 again.

In addition, the spindle 59 or the spiral spring 61 may be blocked so that no tensile force acts on the tension elements 60 to pull the vehicle contact unit 16 upwards from the charging position. This allows the power of the compressed air source 27, in this case the compressor 28, to be reduced during charging.

Then when the electrodes 34 have come into contact with the contact surfaces 13 of the ground contact unit 12, the contact surfaces 13 are rubbed free or abraded free, as indicated in FIG. 5*b*, to remove any oxide layer that may have formed on the contact surfaces 13 and/or on the electrodes 34.

Using the sliding actuators 20, the electrodes 34 are moved in their transverse direction, as described with respect to FIG. 3*c*. The direction of movement, which will be referred to as the sliding direction $R_S$ below, is parallel to the front side of the base 30 and the surface of the contact surfaces 13 and transverse to the contacting direction $R_K$. This means that the electrodes 34 are moved along the contact surfaces 13 and thus slide over the contact surfaces 13, i.e. any oxide layer is removed, so that an electrical connection between the electrodes 34 and the contact surfaces 13 is realized with very low resistance.

In this way, the vehicle 10 is now electrically connected to the charging infrastructure and can be charged.

During charging, an electrical current flows through the electrodes 34, resulting in heating of the electrodes 34 and thus in an increase in the electrical resistance within the electrodes 34 and thermal loading of the electrodes 34 and the surrounding components. In order to cool the electrodes 34, the valve 38 of the air outlet 36 may be open during the entire charging process, so that a continuous air stream flows through the gap 70, which cools the electrodes 34. In this way, losses during charging of the vehicle 10 are reduced and higher charging capacities are achieved.

When the vehicle 10 is fully charged or the vehicle 10 is to be moved, the vehicle contact unit 16 needs to be retracted.

To this end, the compressed air is first discharged from the interior space 24 of the bellows 22 and the compressed air source 27 is deactivated, in this case the compressor 28 is switched off. The pressure from the interior space 24 can be released by means of the air outlet 36 and/or by a further valve (not shown) on the bellows 22.

This is followed by activation of the restoring drive 58. For this purpose, the lock of the spindle 59 or of the spiral spring 61 is released, so that the spiral spring 61 applies a torque to the spindle 59 contrary to the direction of rotation during unwinding. The torque causes the spindle 59 to rotate so that a tensile force acts on the tension elements 60, pulling the tension elements 60 towards the spindle 59.

If an electric motor drive 61' of the spindle 59 is provided, the spindle 59 may of course also be driven by it or the spiral spring 61 may be assisted by it.

The tension elements 60 are thereby wound up onto the spindle 59, as a result of which the base 30 is moved evenly upwards away from the ground contact unit 12 and the bellows 22 is pushed together. Alternatively, the operational system of the compressed air source 27 for generating the overpressure can also be switched over to a negative pressure mode so that it evacuates the bellows 22 and causes it to contract.

When the bellows 22 has reached its collapsed position, the two locking elements 66, 68 lock into each other and hold the bellows 22 in this position.

The vehicle contact unit 16 is now securely stowed at the underbody of the vehicle 10, and the vehicle 10 may be moved safely.

Further embodiments of various aspects of the disclosure will be described in reference to FIGS. 6*a* to 14*b*, the embodiments essentially corresponding to the first embodiment described above. In the following, therefore, only the differences will be discussed, and identical and functionally identical components are provided with the same reference numbers. In addition, for a better overview, only those components that are in focus are shown in the Figures.

The features of the various embodiments relating to the various aspects may, of course, be combined with each other as desired. The combinations of different features to form the embodiments described are only given by way of example.

FIG. 6*a* shows a vehicle contact unit 16 having a base 30, the base 30 including a plurality of air outlets 36 that are, e.g., inclined in different directions. Here, a respective electrode 34 or the center of the base 30 is provided between the air outlets 36.

The electrodes 34 may be arranged in a plurality of rings that are arranged concentrically around the center of the base 30.

FIG. 6b illustrates a further embodiment of a base 30 of the vehicle contact unit 16. In this embodiment, the base 30 has a vent opening 72 which is provided radially outside the electrodes 34, but radially inside the sealing lip 40.

The bellows 22 is fastened to the base 30 in such a way here that the vent opening 72 opens out to the surroundings of the vehicle 10 radially outside the bellows 22.

The vent opening 72 may be opened and closed by a valve or flap (not shown).

Figure 7:
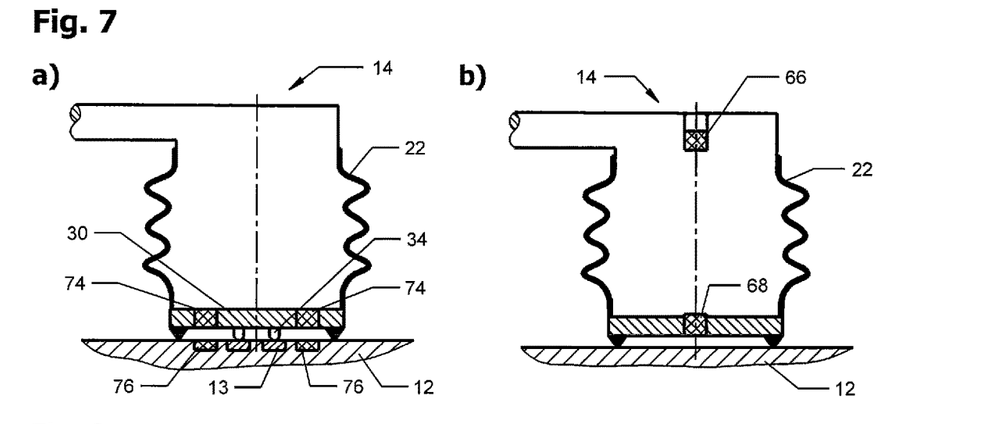
FIGS. 7a, 7b, 8a, 8b, 9a and 9b show, in a greatly simplified manner, different embodiments of the vehicle connection device according to the disclosure.

FIG. 7a shows a further embodiment of the vehicle contact unit 16. In this embodiment, a plurality of switchable magnets 74, for example electromagnets, are provided in the base 30. The magnets 74 are located within the contacting area 32.

It is also conceivable that the magnets 74 are mounted to the front of the base 30.

Furthermore, a plurality of magnetic counterparts 76 are provided in the ground contact unit 12, which are arranged at the same distance as the magnets 74 and act as magnetic counterparts for the magnets 74.

In the embodiment shown, the magnetic counterparts 76 are small plates made of a ferromagnetic material such as steel or iron.

However, it is also conceivable that the magnetic counterparts 76 are magnets themselves, such as permanent magnets or switchable magnets, which then act as counter magnets.

The magnets 74 of the base 30 and the magnetic counterparts 76 of the ground contact unit 12 may be arranged in a certain pattern, the pattern being the same in both the ground contact unit 12 and the base 30.

The magnets 74, 76 are used to align and fix the vehicle contact unit 16 in place with respect to the ground contact unit 12.

When the vehicle contact unit 16 is approached to the ground contact unit 12 and the magnets 74, 76 are activated, the magnets 74, 76 attract each other and thus cause a movement of the vehicle contact unit 16, in particular of the base 30, transversely to the contacting direction $R_K$ until the magnets 74, 76 are aligned vertically one above the other.

Since the electrodes 34 in the base 30 and the contact surfaces 13 of the ground contact unit 12 are arranged in a defined manner relative to the arrangement of the magnets 74, 76, the electrodes 34 are now also located vertically above the contact surfaces 13, so that a contact between the electrodes 34 and the contact surfaces 13 is ensured.

In the embodiment shown in FIG. 7b, the locking elements 66, 68 of the base 30 and of the basic section 26, respectively, are magnets, at least one of which is a switchable electromagnet.

When the bellows 22 is in its collapsed position, the magnets apply the force necessary to hold the bellows 22 in its collapsed position.

In order to release the bellows 22 for inflation, the electromagnet of the two magnets is deactivated so that now no force acts between the two magnets.

Figure 8:
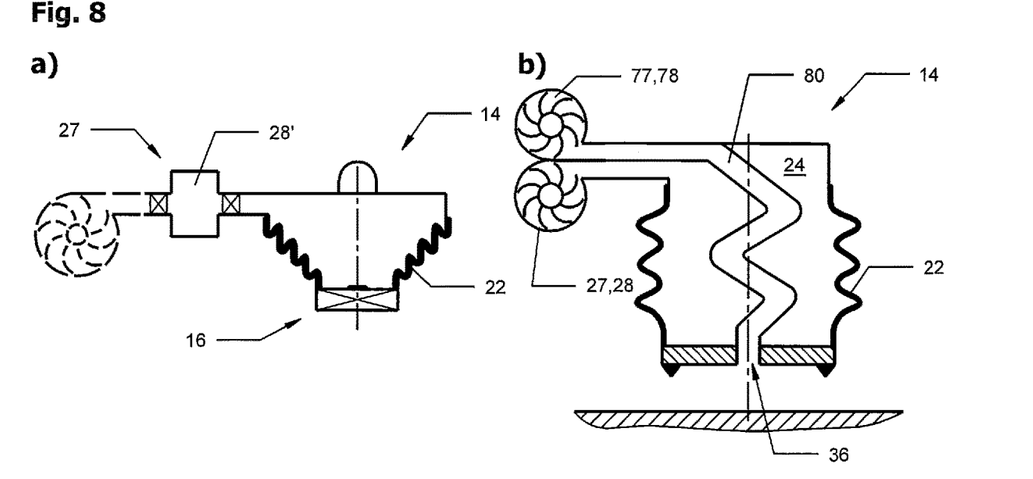

In the embodiment shown in FIG. 8a, the bellows 22 is not in the form of a cylindrical bellows, but configured as a pyramid-shaped bellows.

In addition, the compressed air source 27 is not constructed as a compressor, but includes a pressure accumulator 28', in which air is stored under high pressure.

The compressed air accumulator 28' is filled by a compressor, which is indicated by a dashed line in FIG. 8a. This compressor need not be part of the vehicle connection device 14, but may also be part of some other device of the vehicle 10. For example, the pressure accumulator 28' is filled by the compressor or the vacuum pump of a brake booster of the vehicle 10.

In contrast to the preceding embodiments, the embodiment according to FIG. 8b includes a second compressed air source 77, here a second compressor 78, in addition to the compressed air source 27, which is in fluid communication with the interior space 24 of the bellows 22.

The second compressed air source 77, that is, the second compressor 78 in the embodiment shown, is in fluid communication with a compressed air line 80 which extends through the interior space 24 of the bellows 22 and opens into the air outlet 36.

This means that in this embodiment the air outlet 36 is not connected to the interior space 24 of the bellows 22, but is supplied separately by the second compressed air source 77.

The compressed air line 80 may be designed to be flexible here so that it can follow the movements of the bellows 22 without being damaged.

If a plurality of air outlets 36 are provided, a plurality of air outlets 36 may also be connected to the compressed air line 80.

It is also conceivable, of course, that each air outlet 36 or only some of the air outlets 36 are connected to the second compressed air source 77 by a compressed air line 80 of their own.

It is also conceivable that a compressed air accumulator is provided to serve as the second compressed air source 77.

Figure 9:
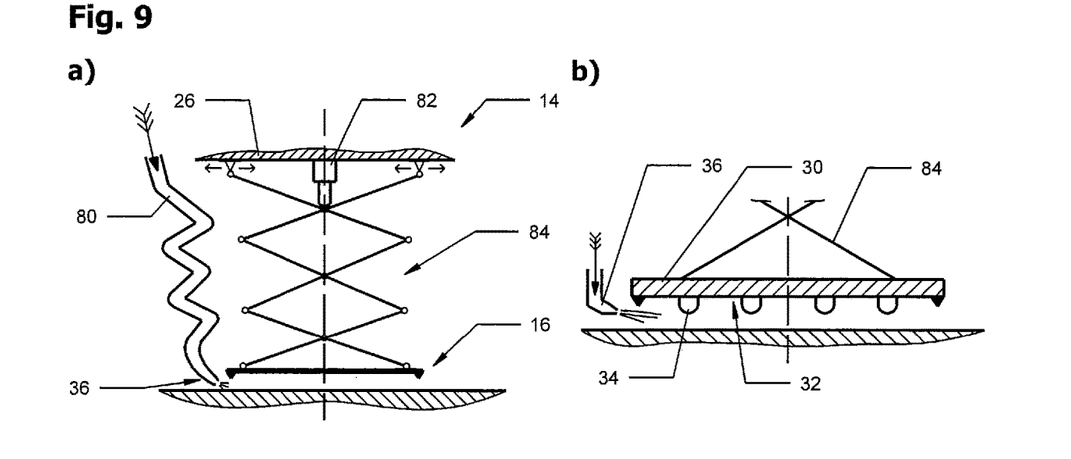

In the embodiment shown in FIGS. 9a and 9b, the contacting actuator 18 does not include a bellows, but the contacting actuator 18 comprises a piston/cylinder unit 82, which may be constructed as a telescopic cylinder, and a scissors-like telescopic guide 84 made up of a plurality of crossed rods which are connected to each other by means of joints.

The vehicle contact unit 16 is provided at one end of the telescopic guide 84, and at its other end the telescopic guide 84 is connected to the basic section 26.

The piston/cylinder unit 82 is coupled to a joint of the telescopic guide 84 and can thus make the telescopic guide 84 longer or shorter.

The piston/cylinder unit 82 here may be a pneumatic cylinder supplied by the compressed air source 27.

Extending laterally next to the telescopic guide 84 is the compressed air line 80, at the end of which the air outlet 36 is provided. As is apparent from FIG. 9b, the air outlet 36 is located beside the vehicle contact unit 16 and is in the form of a nozzle directed into the area in front of the contacting area 32 of the vehicle contact unit 16.

FIGS. 10 to 14b illustrate various embodiments of the sliding actuator 20; the embodiments may be used either separately or in combination.

Figure 10:
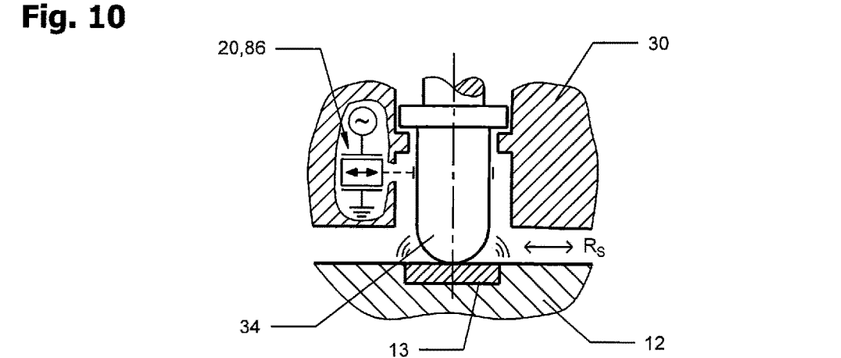
FIGS. 10, 11a, 11b, 12a, 12b and 13 show, in a greatly simplified manner, further embodiments of the vehicle connection device according to the disclosure, with various sliding actuators.
Figure 11:
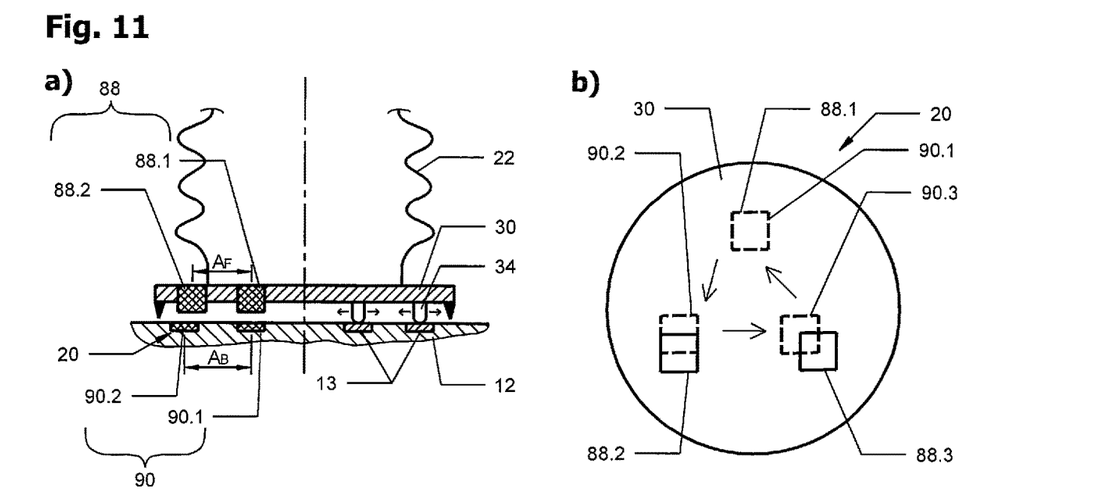
Figure 12:
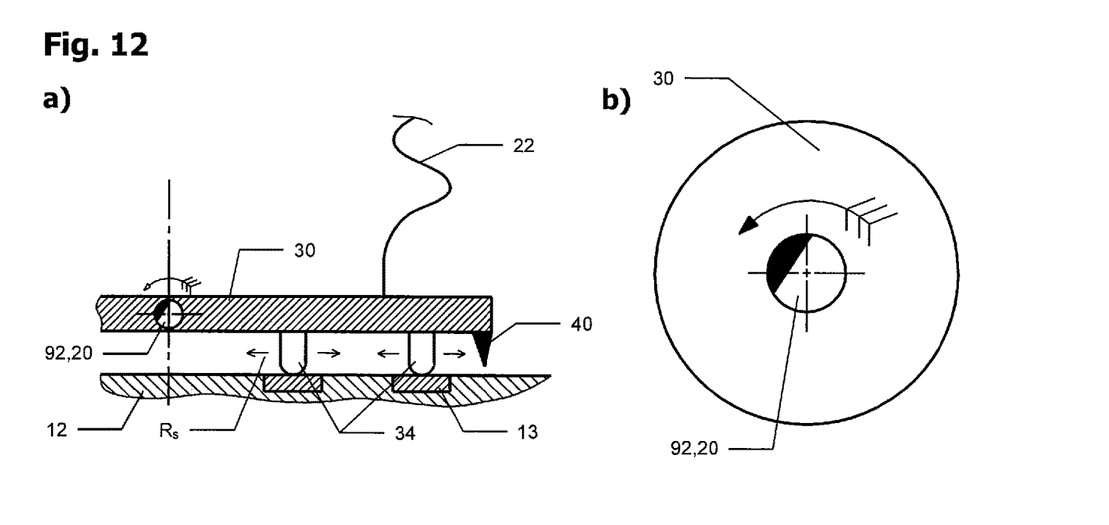

In the embodiment according to FIG. 10, the sliding actuator 20 includes a piezo actuator 86, which is provided in the base 30. The piezo actuator 86 is, on the one hand, fastened in the base 30 and, on the other hand, mechanically connected to the electrode 34, so that upon an activation of the piezo actuator 86, the electrode 34 is moved transversely to its longitudinal extent, i.e. in the sliding direction $R_S$.

A separate piezo actuator 86 may be provided for each electrode 34 here.

The movement of the electrodes 34 generated by the sliding actuator 20 is a linear oscillating movement, like the movement in the first embodiment discussed.

In the embodiments shown in FIGS. 11a and 11b, the sliding actuator 20 comprises at least two switchable magnets 88 provided in the base 30.

The switchable magnets 88 may be electromagnets and are fastened to the front of the base 30.

In FIG. 11a, the magnets 88 are depicted disproportionally large for illustration. Of course, the magnets 88 may also be arranged at other positions of the base 30 and alternately with the electrodes 34.

In the ground contact unit 12 a magnetic counterpart 90 is provided for each of the magnets 88; the magnetic counterparts 90 may be components made of a ferromagnetic material such as iron or steel, e.g. in the form of plates. But permanent magnets or electromagnets are also conceivable as magnetic counterparts.

Here, the distance $A_F$ between the two switchable magnets 88 is smaller than the corresponding distance $A_B$ of the associated magnetic counterparts 90 of the ground contact unit 12.

Now when a first one of the switchable magnets 88.1 is switched on, the switchable magnet 88.1 will align vertically above the associated magnetic counterpart 90.1, so that the entire vehicle contact unit 16 will also move. In this position, which is shown in FIG. 11a, the second switchable magnet 88.2 is not exactly vertically above its associated magnetic counterpart 90.2.

Now when the first switchable magnet 88.1 is switched off and the second switchable magnet 88.2 is switched on instead, the second switchable magnet 88.2 will align with respect to its associated magnetic counterpart 90.2 such that it is located vertically above it. In the process, the entire vehicle contact unit 16 is also moved to the left in FIG. 11b, which causes the electrodes 34 to slide along the contact surfaces 13 of the ground contact unit 12. In this way, a movement of the electrodes 34 over the base 30 along the sliding direction $R_S$ is achieved.

It is also conceivable that, as is schematically illustrated in the embodiment according to FIG. 11b, three magnets 88.1, 88.2 and 88.3 are provided in the base 30. FIG. 11b shows a view from below onto the front of the base 30.

The dashed lines indicate the locations of the magnetic counterparts 90.1, 90.2 and 90.3 in the ground contact unit 12. The distances between the switchable magnets 88.1, 88.2 and 88.3 each differ from the corresponding distances of the magnetic counterparts 90.1, 90.2 and 90.3, so that only one switchable magnet 88 at a time can be aligned vertically above its associated magnetic counterpart 90.

In the situation shown in FIG. 11b, the switchable magnet 88.1 is currently aligned above the corresponding magnetic counterpart 90.1.

Now when the switchable magnet 88.1 is switched off and the switchable magnet 88.2 is switched on instead, the entire vehicle contact unit 16 is moved downwards with respect to FIG. 11b until the magnet 88.2 is positioned vertically above its magnetic counterpart 90.2. Subsequently, when the switchable magnet 88.2 is switched off and the switchable magnet 88.3 is switched on, again a movement of the vehicle contact unit 16 occurs, this time to the right with respect to FIG. 11b. Then the switchable magnet 88.3 can be switched off again and the switchable magnet 88.1 can be switched on again so that a movement of the vehicle contact unit 16 to the position shown in FIG. 11b takes place again. The sliding movement of the electrodes 34 thus occurs along a triangle and is indicated by the arrows in FIG. 11b.

Other polygonal movements involving a different number of magnets and magnetic counterparts are, of course, also possible here.

It is also conceivable that the switchable magnets are provided in the ground contact unit 12.

FIGS. 11a and 11b each show only one group of switchable magnets 88 and magnetic counterparts 90; a plurality of groups arranged in the same pattern may be provided at the base 30 and the ground contact unit 12. Now when the magnets of the various patterns are switched at the same time and in the same order, the force acting on the vehicle contact unit 16 increases, since a plurality of magnets are now involved in the movement.

FIG. 12a illustrates a further embodiment of the sliding actuator 20. In this embodiment, the sliding actuator 20 comprises a vibration motor 92, i.e. a mass rotating about an axis of rotation with an unbalance. The vibration motor 92 is arranged in the base 30.

The axis of rotation of the vibration motor 92 may be arranged in the plane of the base 30 here.

In order to now move the electrodes 34 along the contact surface 13 of the ground contact unit 12, the mass is caused to rotate. Due to the unbalance, the mass exerts a force on the base 30 in the sliding direction $R_S$ transverse to the axis of rotation and thereby also moves the electrodes 34. The sliding movement is thus a linear movement.

In the embodiment shown in FIG. 12b, which otherwise corresponds to the embodiment according to FIG. 12a, the axis of rotation of the vibration motor 92 is oriented perpendicular to the plane of the base 30 and thus in the contacting direction $R_K$.

This orientation of the axis of rotation generates an approximately circular movement of the base 30 and thus also of the electrodes 34 on the contact surfaces 13. If the axis of rotation does not coincide with the central axis of the base 30, the movement is on a curve which may also be an ellipse.

Figure 13:
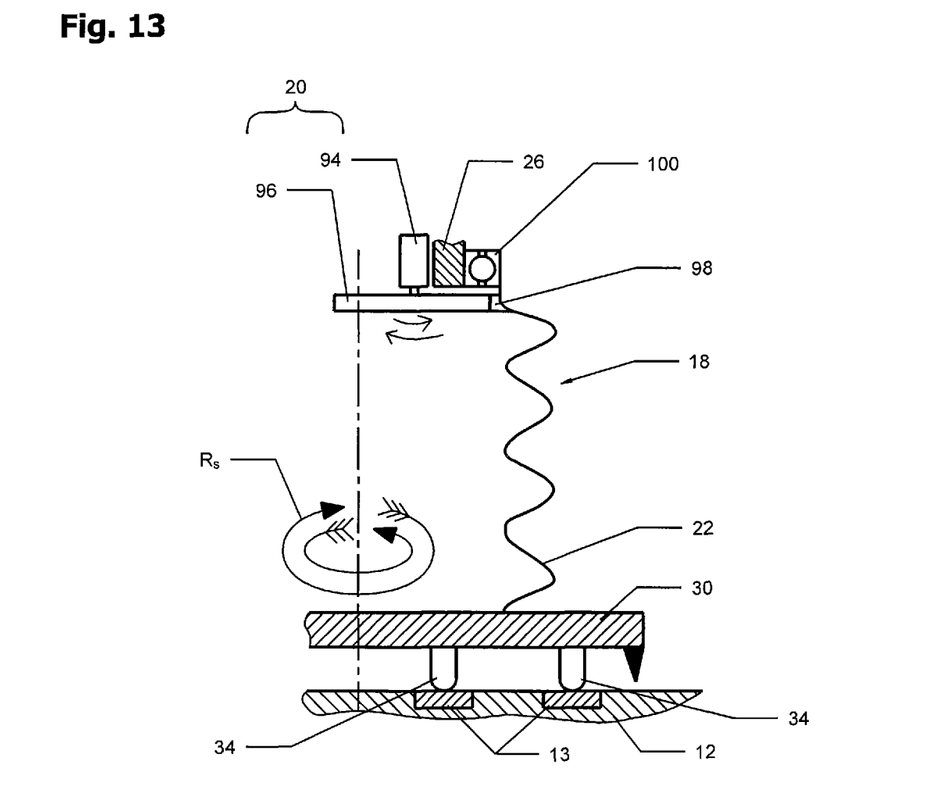
Figure 14:
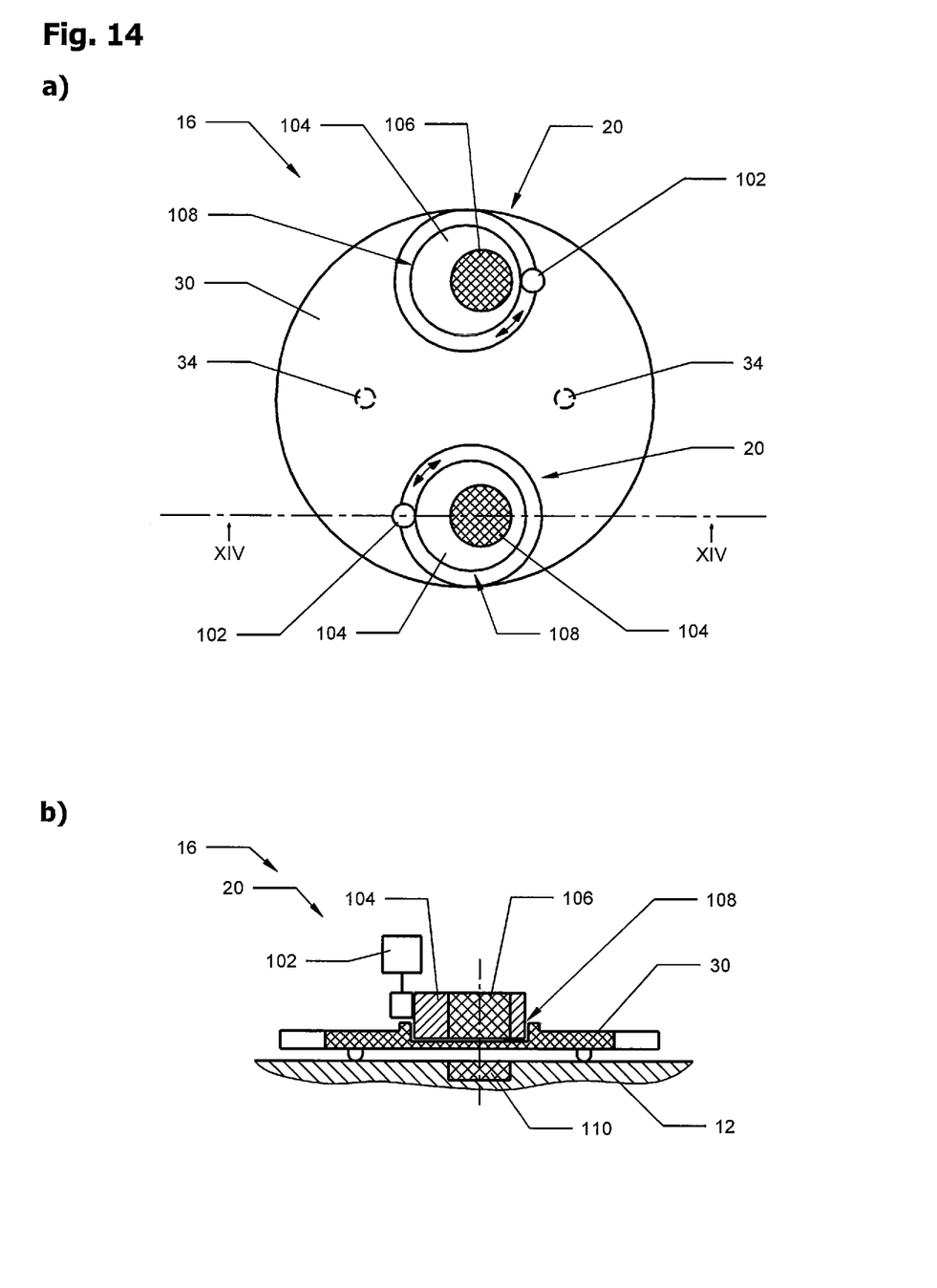

FIG. 13 illustrates a further embodiment of the sliding actuator 20.

In this embodiment, the sliding actuator 20 is configured separately from the vehicle contact unit 16 and mounted directly to a part of the vehicle 10 or to the basic section 26. The sliding actuator 20 is connected, on the one hand, to the vehicle 10 and, on the other hand, to the vehicle side end of the contacting actuator 18.

That is, in this embodiment the contacting actuator 18 is connected to the vehicle 10 by means of the sliding actuator 20.

The sliding actuator 20 includes an electric motor 94 and a gear wheel 96. The output shaft of the electric motor 94 is oriented in the contacting direction $R_K$ and the gear wheel 96 is mounted to the output shaft of the electric motor 94 in the horizontal direction, i.e. in the sliding direction $R_S$.

The gear wheel 96 meshes with a toothing 98 at the vehicle side end of the bellows 22, so that the bellows 22 and thus the entire vehicle contact unit 16 can be rotated by the electric motor 94 and the gear wheel 96. For this purpose, the bellows 22 is fastened to the vehicle 10 or to the basic section 26 by means of a bearing 100.

In order to scrape or rub the contact surfaces 13 of the ground contact unit 12 free, the electric motor 94 is activated, which then sets the gear wheel 96 in motion, causing the entire bellows 22 along with the base 30 and the electrodes 34 attached to it to rotate. The sliding actuator 20 is thus connected to the electrodes 34 via the bellows 22 and the base 30.

The direction of rotation of the electric motor 94 is quickly changed here, so that the rotation of the base 30 covers only few degrees, for example less than 10 degrees. This produces an oscillating movement on a small segment of a circle.

It is, of course, also conceivable that the electric motor 94 is operated in only one direction of rotation, so that the electrodes 34 are moved on a circle.

Although the bellows 22 serves for force transmission of the movement of the sliding actuator 20, the movements produced by the sliding actuator 20 and those produced by the contacting actuator 18 are separate from each other in this embodiment as well.

In the embodiment according to FIGS. 14a and 14b, two sliding actuators 20 are provided on the base 30, each of which includes an actuator 102, in this case an electric motor, a rotating disk 104 and a magnet 106. The magnets 106 are, for example, permanent magnets.

For reasons of clarity, representation of the electrodes 34 or other details has been dispensed with.

The rotating disk 104 is rotatably fastened to the base 30, for example in a guide 108, and connected to the actuator 102, and it may be rotated about an axis of rotation in relation to the base 30 and, for this purpose, is driven by the actuator 102, that is, the electric motor.

The magnet 106 is eccentrically fixed to or in the rotating disk 104 so that the center of the magnet 106 is not located on the axis of rotation of the rotating disk 104. The magnet 106 can therefore be revolved about the axis of rotation along with the rotating disk 104, so that the magnet 106 is adapted to be moved on a circular path relative to the base 30.

In the embodiment shown, the actuator 102, the rotating disk 104 and the magnet 106 are provided on the side of the base 30 facing away from the ground contact unit 12. It is also conceivable, however, that they are arranged on the front of the base 30.

The ground contact unit 12 has a magnetic counterpart 110 provided thereon, which may be configured like the magnetic counterparts 76 and 90.

In the extended charging position of the vehicle contact unit 16, the magnets 106 and the magnetic counterparts 110 strongly attract each other and are fixed in place vertically one above the other. In this way, the vehicle contact unit 16 is, for one thing, aligned with respect to the ground contact unit 12 and, for another thing, fixed to it by means of the magnetic force, similar to the magnets 74, 76 of the embodiment according to FIG. 7a.

Now when the actuators 102, i.e. here the electric motors, are activated, they rotate the rotating disks 104 about their axes of rotation. However, the magnetic force of attraction between the magnets 106 and the magnetic counterparts 110 is so strong that the magnets 106 remain stationary and are not moved relative to the ground contact unit 12. Rather, the base 30 is moved circularly and horizontally in the sliding direction $R_S$ relative to the ground contact unit 12 by the actuators 102.

Therefore, the actuators 102 generate a relative movement between the base 30 and the magnets 106 in the sliding direction $R_S$; viewed in absolute terms, however, it is not the magnets 106 but the base 30 that is moved.

The movement of the base 30 also causes the electrodes 34 to be moved over the ground contact unit 12 in the sliding direction $R_S$.

It is also conceivable that, rather than guiding the magnets 106 on a circular path in relation to the base 30, they are guided linearly, for example on a carriage.

Figure 15:
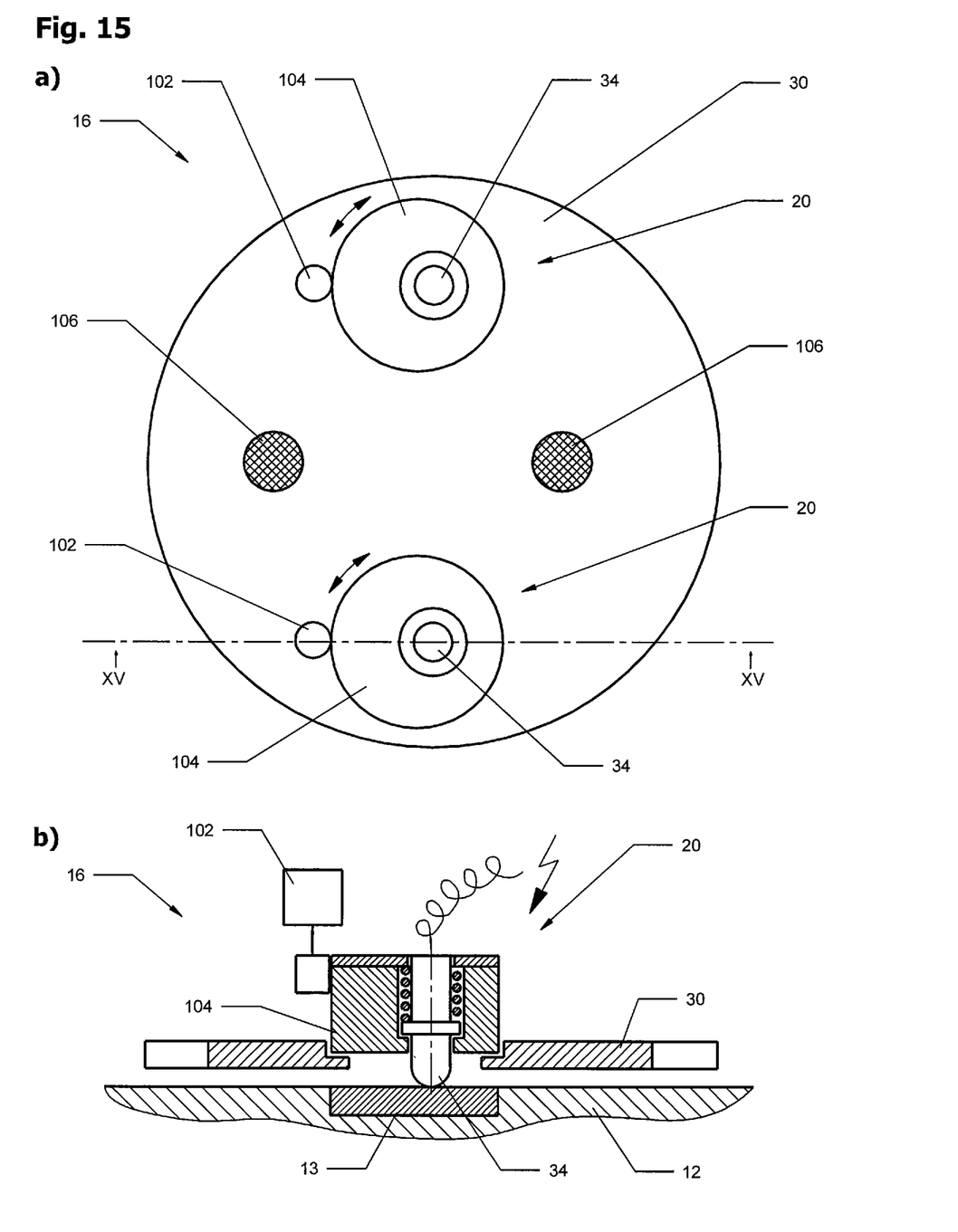

The embodiment according to FIGS. 15a and 15b is very similar to the embodiment according to FIGS. 14a and 14b.

The difference between the two embodiments resides in that in the embodiment according to FIGS. 15a and 15b, a respective one of the electrodes 34 is fixed eccentrically to or in the rotating disk 104, whereas the magnets 106 are fixed in place in the rotating disk 104.

By means of the magnets 106 and the magnetic counterparts 110, the base 30 is now fixed in its position so as to be stationary in relation to the ground contact unit 12. But the electrodes 34 can now be moved relative to the ground contact unit 12 by means of the actuators 102 and the rotating disk 104, so that the electrodes 34 are slid or scraped in circular movements over the ground contact unit 12, especially over the contact surfaces 13.

The invention claimed is:

1. A vehicle connection device for electrically connecting a vehicle contact unit to a ground contact unit of an electric charging infrastructure, comprising:
   the vehicle contact unit,
   a pneumatically operated contacting actuator which is designed to be fastened to the vehicle, to which the vehicle contact unit is fastened, and which is designed to move the vehicle contact unit towards and away from the ground contact unit, and
   at least one air outlet for blowing the ground contact unit free,
   wherein the vehicle contact unit includes a base having a contacting area facing the ground contact unit and having at least two electrodes, and wherein the at least one air outlet for blowing the ground contact unit free is directed to a region in front of the contacting area, the compressed air for operating the contacting actuator being guided to the air outlet in order to blow the ground contact unit free.

2. The vehicle connection device according to claim 1, wherein the at least one air outlet is provided in the base of the vehicle contact unit.

3. The vehicle connection device according to claim 1, wherein the at least one air outlet is provided between two electrodes.

4. The vehicle connection device according to claim 1, wherein a plurality of air outlets are provided, at least one of the electrodes being arranged between the air outlets.

5. The vehicle connection device according to claim 1, wherein at least one of the contacting area and the base is circular, the at least one air outlet being arranged centrally.

6. The vehicle connection device according to claim 1, wherein the base includes a sealing lip circumferentially surrounding the contacting area.

7. The vehicle connection device according to claim 1, wherein the at least two electrodes are in the form of pins or tracks which project with respect to the front of the base and are fastened to the base.

8. The vehicle connection device according to claim 1, wherein the base has a vent opening provided therein, at least one of the electrodes being arranged between the vent opening and the at least one air outlet.

9. The vehicle connection device according to claim 1, wherein at least one magnet is provided at the base on the side of the contacting area.

10. The vehicle connection device according to claim 1, wherein the vehicle connection device includes a heating element that is in fluid communication with the at least one air outlet for heating the air exiting the air outlet.

11. The vehicle connection device according to claim 1, wherein the sliding actuator is configured such that when the at least two electrodes touch the ground contact unit, it can move the at least one electrode along parts of the ground contact unit.

12. The vehicle connection device according to claim 1, wherein the at least one air outlet is provided next to the vehicle contact unit.

13. The vehicle connection device according to claim 12, wherein the at least one air outlet is formed at a compressed air line extending laterally of the contacting actuator.

14. The vehicle connection device according to claim 1, wherein the contacting actuator comprises a piston/cylinder unit or a bellows which include an interior space, a basic section and a compressed air source that is designed to be brought in fluid communication with the interior space, a first end of the piston/cylinder unit or of the bellows being designed to be connected to the vehicle by means of the basic section, and the base being fastened to a second end of the piston/cylinder unit or of the bellows.

15. The vehicle connection device according to claim 14, wherein the at least one air outlet is in fluid communication with the interior space, so that the compressed air inside the interior space serves to actuate the contacting actuator and to blow the ground contact unit free, or the air outlet is formed at a compressed air line extending within the interior space.

16. The vehicle connection device according to claim 1, wherein the contacting actuator can move the vehicle contact unit in a contacting direction, and the vehicle connection device includes a sliding actuator which is connected to at least one of the electrodes such that it can move the at least one electrode of the vehicle contact unit in a sliding direction transverse to the contacting direction.

17. The vehicle connection device according to claim 16, wherein the sliding actuator comprises at least one of a vibration motor, at least one magnet, a piezo actuator and an electric motor.

18. A vehicle connection device for connecting a vehicle contact unit to a ground contact unit of a charging infrastructure, comprising the vehicle contact unit which includes a base, and a contacting actuator which includes a bellows having an interior space, a base, a guide device and a compressed air source, wherein a basic section of the bellows is designed to be connected to the vehicle, wherein a first end of the bellows is fastened to the basic section and the base is fastened to a second end of the bellows, and wherein the guide device comprises a restoring drive and at least one tension element which extends at least partly within the interior space and has one end fastened to the base and another end fastened to the restoring drive.

19. The vehicle connection device according to claim 18, wherein the guide device includes at least one of a spiral spring and an electric motor drive fastened to the spindle in such a way that it applies a torque to the spindle so that a tensile force acts on the tension elements.

20. The vehicle connection device according to claim 18, wherein the first locking element and the second locking element include magnets, one of which comprises a switchable electromagnet.

21. The vehicle connection device according to claim 18, wherein a first locking element is provided on the basic section and a second locking element is provided on the base plate, wherein, when the bellows is in a collapsed position, the first locking element and the second locking element cooperate with each other such that they can hold the bellows in this position.

22. The vehicle connection device according to claim 21, wherein the first locking element and the second locking element include latching hooks which engage with each other when the bellows is in the collapsed position, one of the latching hooks being swivel-mounted.

23. A vehicle connection system comprising a vehicle connection device and a ground contact unit,
wherein the vehicle contact unit includes a base having a contacting area facing the ground contact unit and having at least two electrodes, and at least one air outlet for blowing the ground contact unit free being directed to a region in front of the contacting area, wherein compressed air for operating a contacting actuator being guided to the air outlet in order to blow the ground contact unit free,
wherein the ground contact unit includes at least two electrical contact surfaces for contact with the at least two electrodes of the vehicle contact unit.

* * * * *